UNITED STATES PATENT OFFICE.

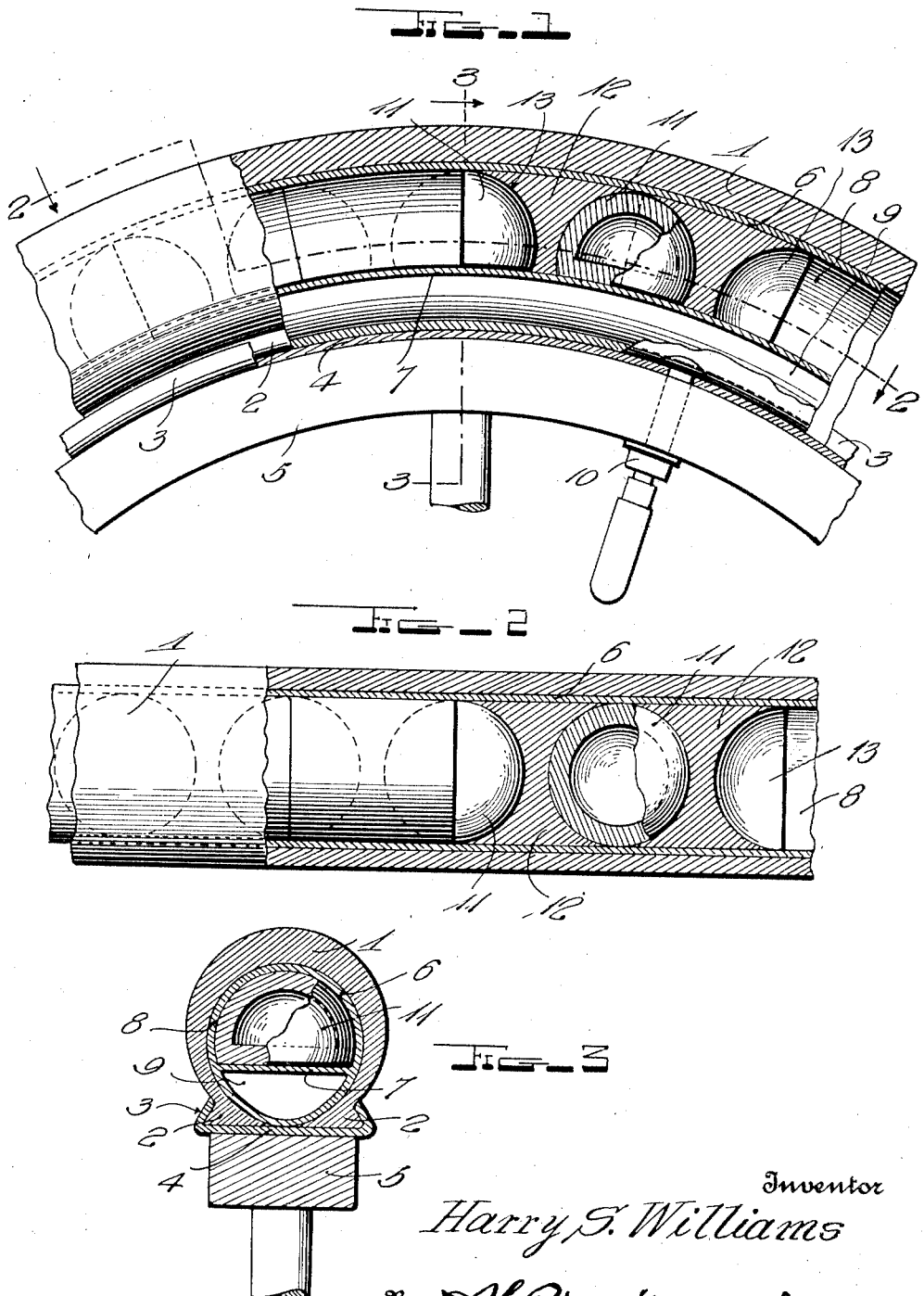

HARRY S. WILLIAMS, OF SAN ANTONIO, TEXAS, ASSIGNOR OF ONE-HALF TO OTTO KELLER, OF SAN ANTONIO, TEXAS.

CUSHION-TIRE.

1,334,205.

Specification of Letters Patent.

Patented Mar. 16, 1920.

Application filed September 4, 1919. Serial No. 321,522.

*To all whom it may concern:*

Be it known that I, HARRY S. WILLIAMS, a citizen of the United States, residing at San Antonio, in the county of Bexar and State of Texas, have invented certain new and useful Improvements in Cushion-Tires; and I do declare the following to be a full, clear, and exact description of the invention, such as will enable others skilled in the art to which it appertains to make and use the same.

This invention relates generally to resilient tires, and more particularly to air cushion tires.

The principal object of the invention is to provide an air cushion tire in which the air is contained in a plurality of removable hollow members so that in case one of the members is punctured, the tire will not as a whole become deflated.

Another object of the invention is to provide a tire of this character having in addition to a plurality of hollow members containing air under pressure, a continuous air chamber disposed at the rim side of the tire so as to lock the outer casing of the tire to the rim of the wheel.

A further object of the invention is to provide a device of this character which will be simple, strong, durable and inexpensive in construction, one which will be efficient and reliable in operation, and well adapted to the purpose for which it is designed.

With these and other objects in view, the invention consists of certain novel features of construction and the combination and arrangement of parts as will be hereinafter fully described and claimed.

In the accompanying drawing in which similar reference characters designate like parts throughout the several views:—

Figure 1 is a fragmental view partly in section and partly in elevation of a tire constructed in accordance with this invention;

Fig. 2 is a sectional view taken substantially on line 2—2 of Fig. 1; and

Fig. 3 is a transverse sectional view taken on the line 3—3 of Fig. 1.

Referring more particularly to the drawing, the numeral 1 designates an outer tire casing provided at its edges with the usual beads 2 adapted to fit under the flanges 3 of a clencher rim 4, the latter being here shown carried upon a wheel felly 5. As will be readily understood, the outer casing 1 is made of flexible resilient or cushioning material, preferably rubber.

Disposed within the casing 1 is an inner tire or filler, which includes a tubular member 6 having a continuous circumferentially extending partition 7 therein to divide it into an outer continuous chamber 8 and an inner continuous chamber 9. The chamber 9 is adapted to contain air under pressure and for the purpose of admitting this air to the chamber or allowing it to pass therefrom the member 6 is provided with a valve 10 similar to the inflating valves in ordinary pneumatic tires.

Disposed within the outer chamber 8 of the member 6 is a plurality of hollow cushion members 11, the latter being partially spherical shaped and having one of their sides substantially flat and contacting with the aforementioned partition 7. The cushion members 11 are made from rubber or other suitable flexible material and contain air under a considerable pressure.

Disposed within the outer chamber 8 and arranged between the cushion members 11 are spacing members 12 having concave recesses 13 at their ends receiving adjacent members 11 therein. These elements 12 are made of rubber or other suitable resilient or cushioning material, and extending from the tread portion of the member 6 to the partition 7, they serve as cushioning devices together with the members 11.

The members 11 and elements 12 are removably disposed in the outer chamber 8, the latter having an opening (not shown) therein at its tread portion for the insertion or removal of these devices. In assembling the tire the cushion members and spacing elements are alternatively inserted through this opening in the member 6 and pushed around in the chamber 8 until the latter is completely filled. The cushion elements 11 being filled with air there is no inflating of the outer chamber to be done.

When the filler is disposed within an outer casing and the complete tire is placed upon a clencher rim 4, and air is pumped into the inner chamber 9, the latter being at the rim side of the filler will exert a pressure against the edges of the tire casing 1 to hold or lock the beads 2 of the same under the flanges 3 of the rim. In view of the fact that the continuous pneumatic chamber 9 of the tire is disposed at the rim side of the same there is very little danger of it being punctured by the penetration of a tack or the like from the tread portion of the tire. Should a tack or the like penetrate the tread portion of the tire and puncture one of the members 11 only this member will be effected and the entire tire will not be deflated. The value of the invention will be thus understood.

Various changes in form, proportion, and in the minor details of construction may be resorted to without departing from the spirit of the invention as defined in the appended claims.

What is claimed is:

A device of the class described comprising a tubular member provided with a circumferential partition dividing it into an inner air chamber and an outer chamber, inflated cushioning members disposed in said outer chamber, said members being partially spherical in shape and having their inner sides flat and contacting with said partition, and spacing elements disposed in said outer chamber and arranged between said members, said elements having concaved recesses at their opposite ends for receiving adjacent members therein.

In testimony whereof I have hereunto set my hand.

HARRY S. WILLIAMS.